(12) United States Patent
Chun et al.

(10) Patent No.: US 8,886,238 B2
(45) Date of Patent: Nov. 11, 2014

(54) METHOD OF ALLOCATING RADIO RESOURCE IN WIRELESS COMMUNICATION SYSTEM

(75) Inventors: Jin Young Chun, Anyang-si (KR); Bin Chul Ihm, Anyang-si (KR); Hyun Soo Ko, Anyang-si (KR)

(73) Assignee: LG Electronics Inc., Seoul (KR)

( * ) Notice: Subject to any disclaimer, the term of this patent is extended or adjusted under 35 U.S.C. 154(b) by 465 days.

(21) Appl. No.: 12/742,716

(22) PCT Filed: Nov. 26, 2008

(86) PCT No.: PCT/KR2008/006968
§ 371 (c)(1),
(2), (4) Date: May 13, 2010

(87) PCT Pub. No.: WO2009/069938
PCT Pub. Date: Jun. 4, 2009

(65) Prior Publication Data
US 2011/0117943 A1    May 19, 2011

Related U.S. Application Data

(60) Provisional application No. 60/991,206, filed on Nov. 29, 2007.

(30) Foreign Application Priority Data

Mar. 25, 2008 (KR) ........................ 10-2008-0027432

(51) Int. Cl.
*H04W 40/00* (2009.01)
(Continued)

(52) U.S. Cl.
CPC ............. *H04L 5/0007* (2013.01); *H04W 72/04* (2013.01); *H04L 5/0091* (2013.01); *H04L 5/0039* (2013.01); *H04W 72/0453* (2013.01)

USPC ........... 455/509; 455/447; 455/450; 370/329; 370/330; 370/343; 375/150; 375/260

(58) Field of Classification Search
CPC ... H04L 5/007; H04L 5/0023; H04L 27/2647; H04W 16/02; H04W 16/12; H04W 16/24; H04W 28/04; H04W 72/04; H04W 72/044; H04W 84/08
USPC ......... 455/63.1, 446, 447, 450, 509; 370/208, 370/210, 326, 329, 330, 343, 344, 437; 375/150, 260
See application file for complete search history.

(56) References Cited

U.S. PATENT DOCUMENTS 6,545,997 B1    4/2003    Bohnke et al.
7,185,256 B2    2/2007    Miki et al.
(Continued)

FOREIGN PATENT DOCUMENTS

JP    2007-288754 A    11/2007
KR    1020050040058 A    5/2005
(Continued)

*Primary Examiner* — Yuwen Pan
*Assistant Examiner* — Paul P Tran
(74) *Attorney, Agent, or Firm* — Mckenna Long & Aldridge LLP (57) ABSTRACT

A method of allocating radio resources in a wireless communication system includes dividing the overall frequency band into a plurality of frequency blocks including at least one subcarrier in a frequency domain, and allocating an allocation unit including some of the plurality of frequency blocks to a user equipment (ITE), wherein the allocation unit is any one of a localized allocation unit including frequency blocks contiguous in the frequency domain and a distributed allocation unit including frequency blocks distributed in the frequency domain. Allocation schemes of subcarriers are freely used suitably according to channel environments of users, the scheduling effect of radio resources can be enhanced.

5 Claims, 8 Drawing Sheets

(51) Int. Cl.
*H04W 72/00* (2009.01)
*H04B 7/00* (2006.01)
*H04W 4/00* (2009.01)
*H04J 1/00* (2006.01)
*H04B 1/00* (2006.01)
*H04K 1/00* (2006.01)
*H04L 27/28* (2006.01)
*H04W 72/04* (2009.01)
*H04L 5/00* (2006.01)

(56) References Cited

U.S. PATENT DOCUMENTS

| | | | |
|---|---|---|---|
| 2002/0136174 A1* | 9/2002 | Gleeson | 370/329 |
| 2004/0190482 A1 | 9/2004 | Baum et al. | |
| 2005/0195732 A1 | 9/2005 | Huh et al. | |
| 2005/0286402 A1 | 12/2005 | Byun et al. | |
| 2005/0286408 A1 | 12/2005 | Jin et al. | |
| 2006/0285479 A1 | 12/2006 | Han et al. | |
| 2007/0009054 A1 | 1/2007 | Kwak et al. | |
| 2007/0058595 A1 | 3/2007 | Classon et al. | |
| 2007/0153929 A1 | 7/2007 | Ballentin et al. | |
| 2007/0165731 A1 | 7/2007 | Xiao et al. | |
| 2007/0173198 A1 | 7/2007 | Kim et al. | |
| 2007/0183384 A1* | 8/2007 | Kwak et al. | 370/338 |
| 2007/0195899 A1 | 8/2007 | Bhushan et al. | |
| 2007/0206558 A1* | 9/2007 | Akita et al. | 370/344 |
| 2007/0217362 A1 | 9/2007 | Kashima et al. | |
| 2007/0223364 A1 | 9/2007 | Terabe et al. | |
| 2007/0242636 A1 | 10/2007 | Kashima et al. | |
| 2007/0258404 A1 | 11/2007 | Tirkkonen et al. | |
| 2007/0268816 A1* | 11/2007 | Hosein | 370/208 |
| 2008/0070632 A1* | 3/2008 | Obuchi et al. | 455/561 |
| 2008/0141093 A1 | 6/2008 | Kwon et al. | |
| 2008/0167040 A1 | 7/2008 | Khandekar et al. | |
| 2009/0052381 A1 | 2/2009 | Gorokhov et al. | |
| 2009/0129362 A1* | 5/2009 | Higuchi et al. | 370/343 |
| 2009/0209256 A1* | 8/2009 | Nakashima et al. | 455/436 |
| 2009/0213802 A1* | 8/2009 | Miki et al. | 370/329 |
| 2009/0232062 A1* | 9/2009 | Higuchi et al. | 370/329 |
| 2009/0245197 A1 | 10/2009 | Ma et al. | |
| 2009/0262699 A1 | 10/2009 | Wengerter et al. | |
| 2010/0177715 A1* | 7/2010 | Ofuji et al. | 370/329 |
| 2011/0065468 A1* | 3/2011 | Parkvall et al. | 455/509 |

FOREIGN PATENT DOCUMENTS

| | | |
|---|---|---|
| KR | 10-0606099 B1 | 7/2006 |
| KR | 1020060074803 A | 7/2006 |
| KR | 10-2007-0080191 A | 8/2007 |
| WO | WO 2007083569 A1 | 7/2007 |
| WO | WO 2007083569 A1 * | 7/2007 |

* cited by examiner

METHOD OF ALLOCATING RADIO RESOURCE IN WIRELESS COMMUNICATION SYSTEM

This application is a national phase application based on International Application No. PCT/KR2008/006968, filed Nov. 26, 2008, which claims priority to U.S. Provisional Application No. 60/991,206, filed on Nov. 29, 2007 and Korean Patent Application No. 10-2008-0027432, file on Mar. 25, 2008, all of which are incorporated by reference for all purposes as if fully set forth herein.

TECHNICAL FIELD

The present invention relates to wireless communications and, more particularly, to a method for effectively allocating radio resources.

BACKGROUND ART

An IEEE (Institute of Electrical and Electronics Engineers) 802.16 standards provide techniques and protocols to support a broadband wireless access. Standardization proceeded starting from 1999 and IEEE 802.16-2001 was approved in 2001. It is based on a single carrier physical layer called 'WirelessMAN-SC'. Later, besides the 'WirelessMAN-SC', 'WirelessMAN-OFDM' and 'WirelessMAN-OFDMA' were added to the physical layer in IEEE 802.16a standards approved in 2003. After the IEEE 802.16a standards were completed, revised IEEE 802.16-2004 standards were approved in 2004. IEEE 802.16-2004/Cor1 was completed in the form of 'corrigendum' in 2005 in order to resolve and correct bugs and errors of the IEEE 802.16-2004 standards.

One of systems considered in the next generation is an OFDM (Orthogonal Frequency Division Multiplexing) system that can attenuate an inter-symbol independent effect with a low complexity. The OFDM converts serially inputted data symbols into the N number of parallel data symbols, carries them in the N number of separated subcarriers, and transmits the same. The subcarriers maintain orthogonality in a frequency domain. The respective orthogonal channels experience mutually independent frequency selective fading, and the intervals of transmitted symbols are lengthened to minimize the inter-symbol interference. OFDMA refers to a multi-access scheme accomplishing multiple accesses by independently providing portions of available subcarriers to each user in a system using the OFDM as a modulation scheme. The OFDMA provides frequency resources called subcarriers to each user, and in general, the respective frequency resources are independently provided to multiple users so as not to overlap with each other. That is, resultantly, frequency resources are mutually exclusively allocated to the users.

A plurality of subcarriers provided to a user may be distributedly allocated to the overall frequency band for frequency diversity. Alternatively, a subcarrier of a particular frequency band may be locally allocated to a user with a good channel state in the corresponding frequency band. Currently, the IEEE 802.16 system employs TDM (Time Division Multiplexing in which a distributed allocation scheme and a local allocation scheme are discriminated by time domain. Namely, in the same time zone, distributed allocation and local allocation of subcarriers cannot be used together. Frequency resources are desired to be utilized according to each scheme suitable for various channel environments of multiple users, but the limitation in the allocation schemes of subcarriers according to time zones may restrict radio resource scheduling.

Thus, a method for freely using a subcarrier allocation scheme suitably according to various channel environments of users is required.

DISCLOSURE OF INVENTION

Technical Problem

Therefore, an object of the present invention is to provide a method for effectively applying a subcarrier allocation scheme.

Technical Solution

In an aspect, a method of allocating radio resources in a wireless communication system, including: dividing the overall frequency band into a plurality of frequency blocks including at least one subcarrier in a frequency domain, and allocating an allocation unit including some of the plurality of frequency blocks to a user equipment (UE), wherein the allocation unit is any one of a localized allocation unit including frequency blocks contiguous in the frequency domain and a distributed allocation unit including frequency blocks distributed in the frequency domain.

In another aspect, aspect, a method of allocating radio resources in a wireless communication system, including: allocating localized frequency blocks mapped to a plurality of physical subcarriers continuous in a frequency domain in the overall frequency band to a first user, and allocating distributed frequency blocks mapped to a plurality of physical subcarriers distributed in the frequency domain in the overall frequency band to a second user.

Advantageous Effects

In the present invention, a subcarrier allocation scheme can be freely used suitably according to a channel environment of a user, so the scheduling efficiency of radio resources can be enhanced.

MODE FOR THE INVENTION

Figure 1:
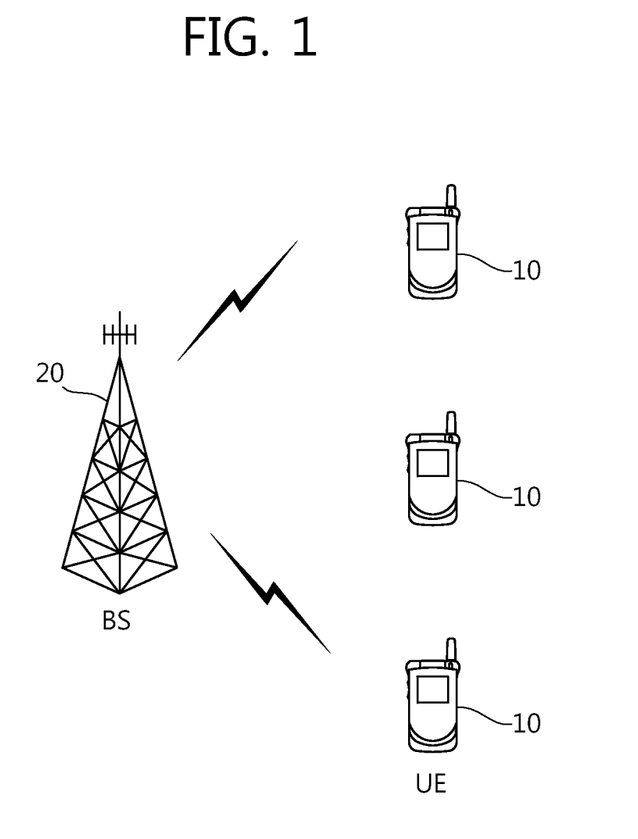
FIG. 1 shows an example of a wireless communication system.

FIG. 1 shows a wireless communication system. The wireless communication system can be widely deployed to provide a variety of communication services, such as voices, packet data, etc.

Referring to FIG. 1, the wireless communication system includes a base station (BS) 20 and user equipments (UEs) 10.

The UEs 10 may be fixed or have mobility, and may be referred to as another terminology, such as a mobile station (MS), a user terminal (UT), a subscriber station (SS), a wireless device, etc. The BS 20 generally refers to a fixed station that communicates with the UEs 10 and may be called another terminology, such as a node-B, a base transceiver system (BTS), an access point, etc. There are one or more cells within the coverage of the BS 20.

Hereinafter, downlink refers to communication from the BS 20 to the UEs 10, and uplink refers to communication from the UEs 10 to the BS 20. In the downlink, a transmitter may be a part of the BS 20, and a receiver may be a part of the UEs 10. In the uplink, a transmitter may be a part of the UEs 10, and a receiver may be a part of the BS 20.

The wireless communication system may be an OFDM (Orthogonal Frequency Division Multiplexing)/OFDMA (Orthogonal Frequency Division Multiple Access)-based system. The OFDM uses a plurality of orthogonal subcarriers. The OFDM uses orthogonality between IFFT (Inverse Fast Fourier Transform) and FFT (Fast Fourier Transform). The transmitter performs IFFT on data and transmits the same. The receiver performs FFT on a reception signal to restore the original data. The transmitter uses IFFT to combine multiple subcarriers, and the receiver uses corresponding FFT to separate the multiple subcarriers.

Figure 2:
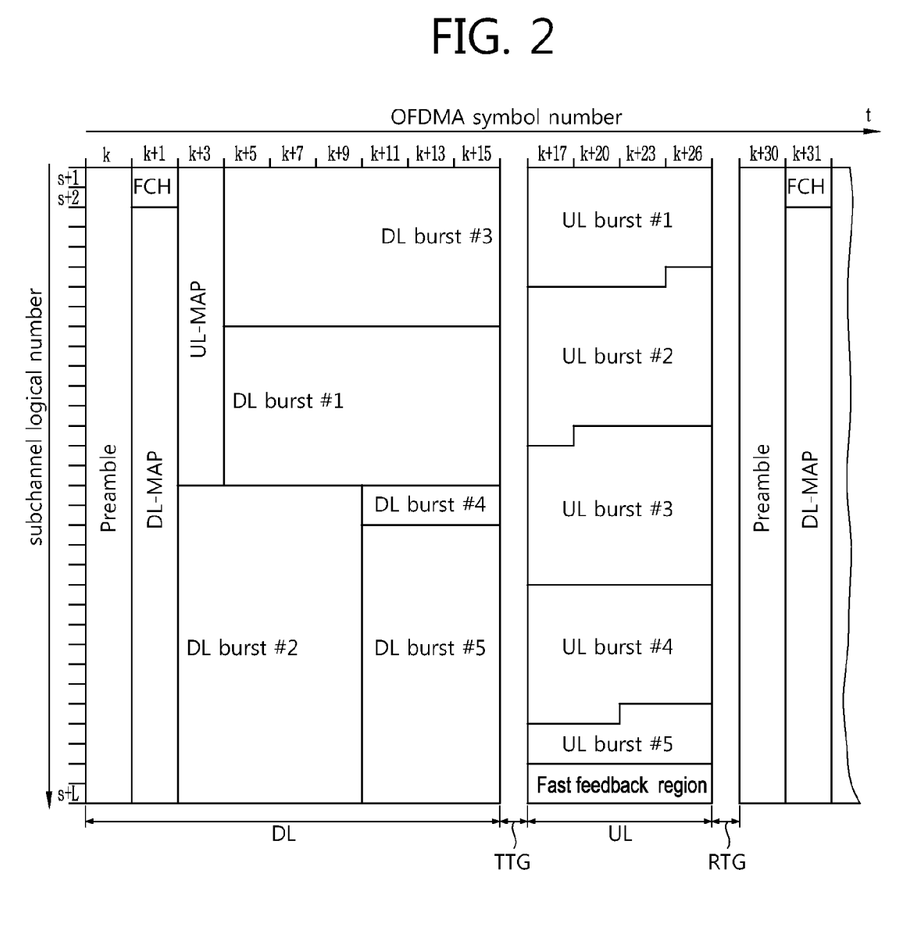
FIG. 2 is a drawing illustrating an example of a frame structure.

FIG. 2 shows an example of a frame structure. The frame refers to a data sequence during a fixed time period used according to physical specifications. It may refer to 8.4.4.2 paragraph of "Part 16: Air Interface for Fixed Broadband Wireless Access Systems" of IEEE standards 802.16-2004 (referred to as 'Reference document 1', hereinafter).

Referring to FIG. 2, the frame includes a downlink frame and an uplink frame. Time division duplex (TDD) refers to a method in which uplink and downlink transmissions share the same frequency but occur at each different time. The downlink frame temporally goes ahead of the uplink frame. The downlink frame includes a preamble, a frame control header (FCH), a DL (Downlink)-MAP, a UL (Uplink)-MAP, a burst region, starting in this order. A guard time for discriminating the uplink frame and the downlink frame is inserted into a middle portion of the frame (i.e., between the downlink frame and the uplink frame), and to a final portion (after the uplink frame). A transmit/receive transition gap (TTG) refers to a gap between the downlink burst and the subsequent uplink burst. A receive/transmit transition gap (RTG) refers to a gap between the uplink burst and a subsequent downlink burst.

The preamble is used for initial synchronization, cell search, frequency offset, and channel estimation between a BS and a UE. The FCH includes the length of a DL-MAP message and coding information of the DL-MAP message.

The DL-MAP is a region on which the DL-MAP message is transmitted. The DL-MAP message defines an access of a downlink channel. The DL-MAP message includes a configuration change count of a DCD (Downlink Channel Descriptor) and a base station ID (Identifier). The DCD describes a downlink burst profile applied to a current map. The downlink burst profile refers to characteristics of a downlink physical channel, and the DCD is periodically transmitted by the base station via a DCD message.

The UL-MAP is a region on which a UL-MAP message is transmitted. The UL-MAP message defines an access of an uplink channel. The UL-MAP message includes a configuration change count of a UCD (Uplink Channel Descriptor) and a valid start time of uplink allocation defined by the UL-MAP. The UCD describes an uplink burst profile. The uplink burst profile refers to characteristics of an uplink physical channel, and the UCD is periodically transmitted by the base station via a UCD message.

A portion of the uplink frame includes a fast feedback region. The fast feedback region, which is a region allocated for a faster uplink transmission than general uplink data, may include various information such as a CQI, an ACK/NACK signal, or the like. The fast feedback region may be positioned anywhere in the uplink frame, without being limited to the position or size as illustrated in FIG. 2.

Hereinafter, a slot is a minimum available data allocation unit and defined as time and a subchannel. The number of subchannels depends upon the size of FFT and time-frequency mapping. Subchannels include a plurality of subcarriers. The number of subcarriers per subchannel differs depending on permutations. Permutation refers to mapping of a logical subchannel to a physical subcarrier. In full usage of subchannels (FUSC), a subchannel includes 48 subcarriers, and in a partial usage of subchannels (PUSC), a subchannel includes 24 or 16 subcarriers. A segment refers to at least one subchannel set.

Data of a physical layer is mapped to a physical subcarrier through two steps. In a first step, data is mapped to at least one data slot in at least one logical subchannel. In a second step, each logical subchannel is mapped to physical subcarriers. This is called permutation. The reference document 1 discloses permutations such as FUSC, PUSC, O-FUSC (Optional-FUSC), O-PUSC (Optional-PUSC), AMC (Adaptive Modulation and Coding), or the like. A set of OFDM symbols using the same permutation is called a permutation zone, and a single frame includes at least one permutation zone.

The FUSC and the O-FUSC are used only for downlink transmission. The FUSC includes a single segment including every subchannel group. Each subchannel is mapped to a physical subcarrier distributed in the entire physical channels. This mapping changes for each OFDM symbol. A slot includes a single subchannel in a single OFDM symbol. The O-FUSC has a different pilot allocation method from that of the FUSC.

The PUSC is used for both downlink transmission and uplink transmission. In downlink, respective physical channels are divided into clusters each having 14 contiguous subcarriers in two OFDM symbols. The physical channels are mapped to six groups. In each group, pilot is allocated to each cluster and is in a fixed position. In the uplink, each subcarrier may include a plurality of tiles including four contiguous physical subcarriers on three OFDM symbols. Each subchannel includes six tiles. Pilot is allocated to corners of each tile. The O-PUSC is used only for uplink transmission, and each tile includes three continuous physical subcarriers on three OFDM symbols. Pilot is allocated to the center of each tile.

AMC (Adaptive Modulation and Coding) is used for down link transmission and uplink transmission. A bin includes nine contiguous subcarriers on OFDM symbols. A band refers to a group of four rows of bins, and an AMC subchannel includes six contiguous bins in the same band.

Figure 3:
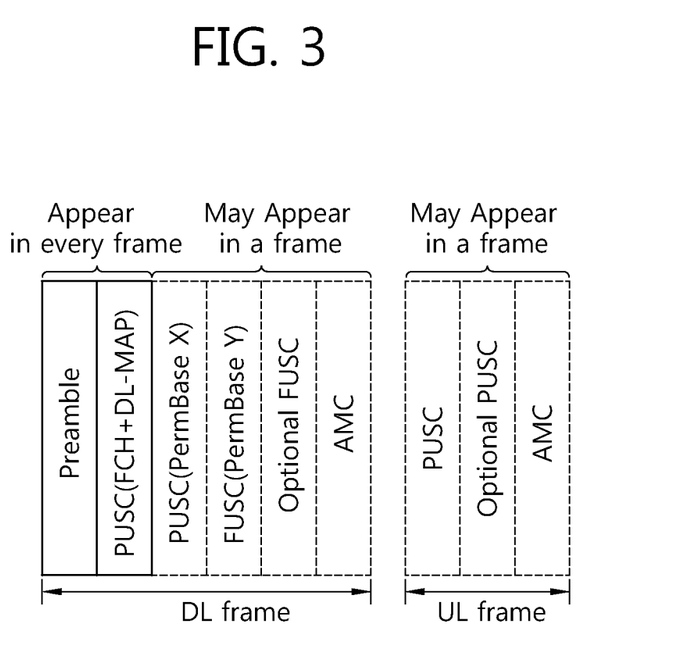
FIG. 3 shows an example of a frame including a plurality of permutations.

FIG. 3 shows an example of a frame including a plurality of permutations. The frame can be a physical frame.

Reference to FIG. 3, in the downlink (DL) frame, a preamble, an FCH, and a DL-MAP appear in every frame. PUSC permutation is applied for the FCH and the DL-MAP. In the DL frame, PUSC, FUSC, optional PUSC, AMC permutations, or the like, may appear. The permutations appearing in the DL frame may be designated by the DL-MAP. In the uplink (UL) frame, PUSC, optional PUSC, AMC permutations, or the like, may appear. The permutations appearing in the UL frame may be designated by the UL-MAP. The types of permutations used in the UL frame and the DL frame are not limited but can be modified variably. Data or control information of each frame can be accurately acquired via the preamble, the FCH, the DL-MAP, or the like, of each frame.

In mapping logical subchannels to physical subcarriers, respective subcarriers are distributedly disposed in the overall frequency band in the FUSC permutation, subcarriers are distributedly disposed by tiles or clusters in the PUSC permutation, and subcarriers are disposed by AMC subchannels in the AMC permutation. In terms of allocation of subcarriers in the frequency domain, the FUSC and PUSC permutations may be called a distributed allocation of subcarriers, while the AMC permutation may be called a localized allocation of subcarriers.

The method for effectively applying the distributed allocation and the localized allocation of subcarriers regardless of permutation zones will now be described.

Figure 4:
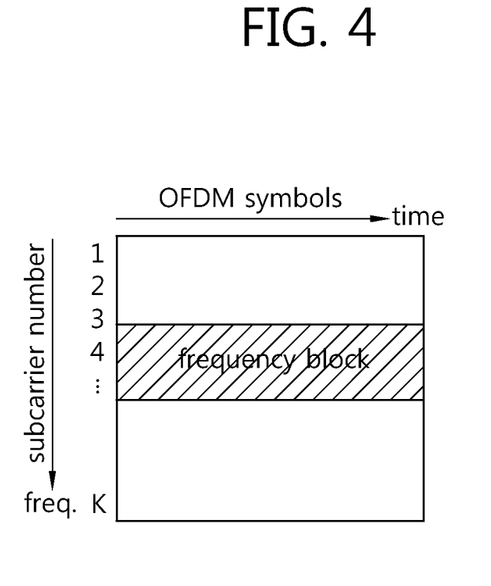
FIG. 4 shows a resource region according to one embodiment of the present invention.

FIG. 4 shows a resource region according to one embodiment of the present invention.

Referring to FIG. 4, a resource region includes a plurality of subcarriers in the frequency domain and at least one OFDM symbol in the time domain. The resource region includes a plurality of frequency blocks. The frequency blocks refer to a bundle of a plurality of subcarriers in the frequency domain. Namely, the frequency blocks include at least one OFDM symbol in the time domain, and in this case, the number of included OFDM symbols does not matter. The range of the frequency blocks in the time domain may correspond to the range of the downlink frame or the uplink frame.

Various applications of the distributed allocation and the localized allocation using frequency blocks will now be described.

Figure 5:
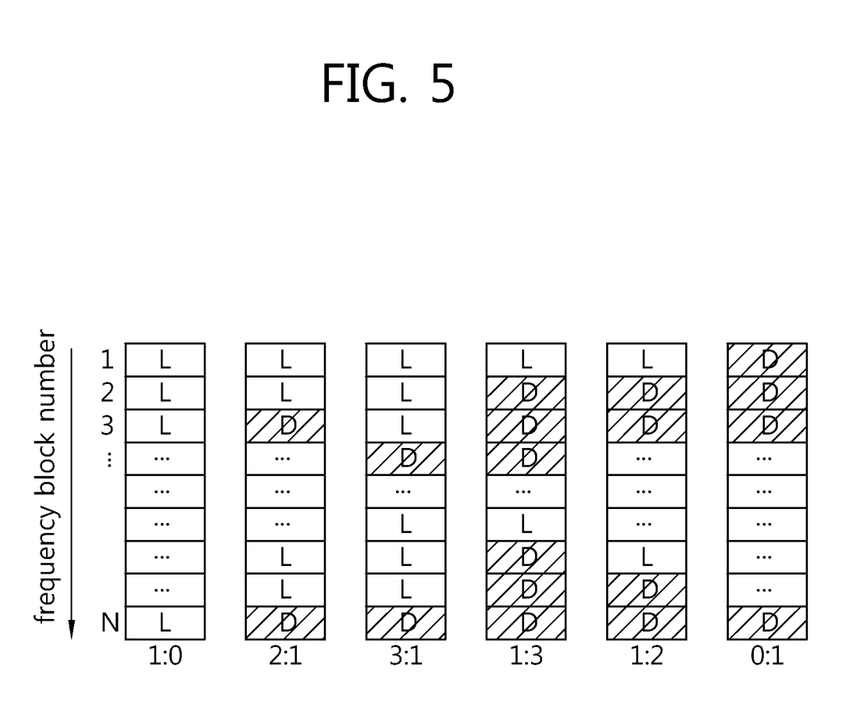
FIG. 5 shows an allocation scheme using frequency blocks according to one embodiment of the present invention.

FIG. 5 shows an allocation scheme using frequency blocks according to one embodiment of the present invention.

Referring to FIG. 5, a frequency block is a basic unit of the distributed allocation and the localized allocation of subcarriers. Frequency blocks for the distributed allocation of subcarriers are called distributed frequency blocks (D), while frequency blocks for the localized allocation of subcarriers are called localized frequency blocks (L). The distributed allocation of subcarriers refers to a method for allocating the physical subcarriers such that the physical subcarriers, as well as the FUSC and the PUSC permutations, are distributed discontinuously in the frequency domain. Subcarriers allocated to a single user may be distributedly disposed over several distributed frequency blocks. The localized allocation of subcarriers refers to a method for allocating physical subcarriers, as well as the AMC permutation, continuously in the frequency domain.

The overall frequency band may be divided into the N number of frequency blocks. The distributed frequency blocks (D) and the localized frequency blocks (L) may be allocated according to a ratio. For example, the overall frequency band of 5 MHz includes 512 subcarriers, and if some 408 subcarriers of them are used as valid subcarriers and a single frequency block includes four subcarriers, the overall frequency band may be divided into 102 frequency blocks. In this case, the 102 frequency blocks may be allocated as localized frequency blocks and distributed frequency blocks according to a ratio. The ratio between the localized frequency blocks and the distributed frequency blocks may vary, for example, which (L:D) is 1:0, 2:1, 3:1, 1:3, 1:2, 0:1, or the like. The BS may freely adjust the ratio between the localized frequency blocks and the distributed frequency blocks. The ratio between the localized frequency blocks and the distributed frequency blocks may be informed to the UE via the FCH, the DL-MAP or a broadcast message.

The above-mentioned ratios between the localized frequency blocks and the distributed frequency blocks may be merely examples. That is, such ratios can be modified variably so as to be applied, and the positions of the localized frequency blocks and the distributed frequency blocks are not limited in the overall frequency band.

Also, the localized frequency blocks and the distributed frequency blocks are not necessarily allocated according to a ratio. That is, a certain number of frequency blocks, among the N number of frequency blocks, may be allocated as the localized frequency blocks or the distributed frequency blocks. The BS may allocate a plurality of frequency blocks to the UE and inform the UE about the allocated frequency blocks and an allocation scheme of the frequency blocks via the FCH, the DL-MAP, or a broadcast message.

Because the localized allocation scheme and the distributed allocation scheme are freely used within the same time range, subcarrier allocation schemes suitable for channel environments of many users can be effectively applied. For example, if radio resources are intended to be allocated to multiple users in a single resource region (resource domain), localized frequency blocks of a frequency band with a good channel state may be allocated to a first user, and distributed frequency blocks may be allocated to a second user who does not have a frequency band with a channel state that cannot be known or without a particularly good channel state. Because the BS can freely adjust the ratio between the localized frequency blocks and the distributed frequency blocks, it can effectively perform the localized allocation or the distributed allocation in a single radio region by reflecting the channel states of users.

Figure 6:
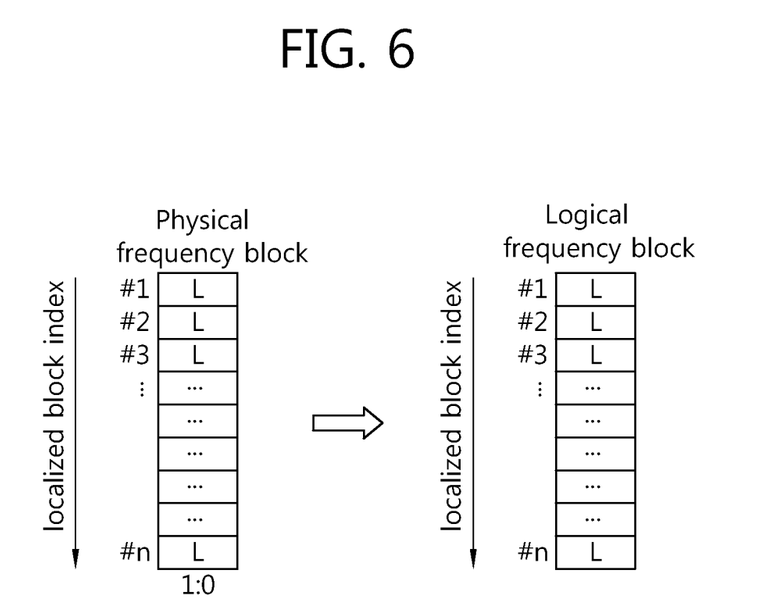
FIG. 6 shows mapping of physical frequency blocks to logical frequency blocks according to one embodiment of the present invention.

FIG. 6 shows mapping of physical frequency blocks to logical frequency blocks according to one embodiment of the present invention.

Referring to FIG. 6, as for the localized frequency blocks, when physical frequency blocks are logically mapped to logical frequency blocks, the physical frequency blocks are mapped to the logical frequency blocks in order (in regular sequence). Accordingly, the block indexes of the logical frequency blocks are arranged in the same order as those of the physical frequency blocks. For example, if the ratio between the localized frequency blocks and the distributed frequency blocks is 1:0, the block indexes (#1, . . . , #n) of the physical frequency blocks become the block indexes (#1, . . . , #n) of the logical frequency blocks as it is.

The physical mapping from the logical frequency blocks to the physical frequency blocks may be made as a reverse process of the logical mapping. When the BS informs the UE about the block indexes of the logical frequency blocks, the UE can search the indexes of the physical frequency blocks from the block indexes of the logical frequency blocks.

Figure 7:
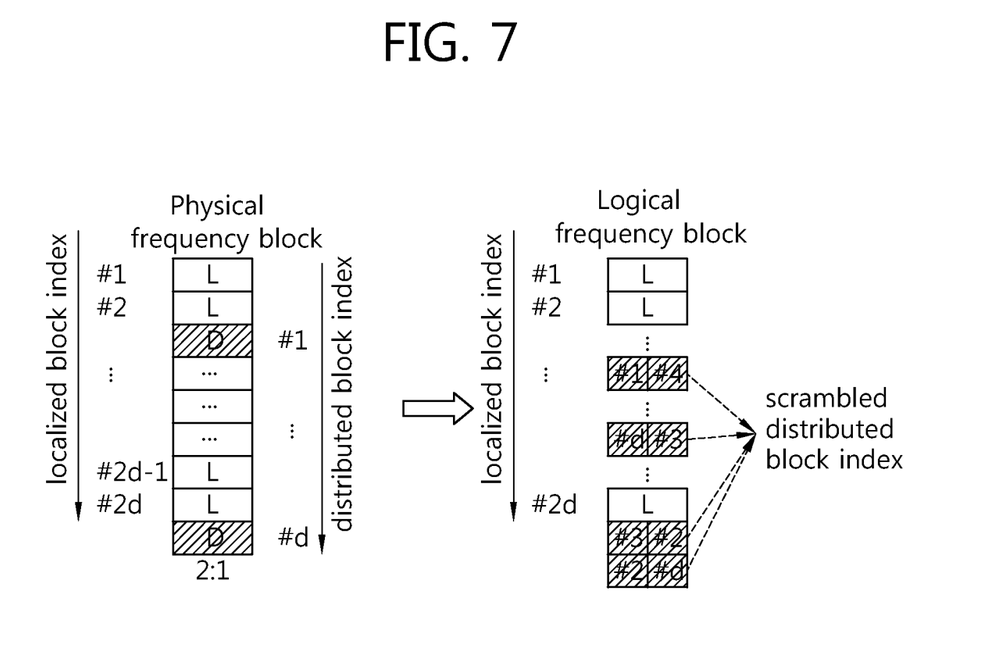
FIG. 7 shows mapping of physical frequency blocks to logical frequency blocks according to another embodiment of the present invention.

FIG. 7 shows mapping of the physical frequency blocks to the logical frequency blocks according to another embodiment of the present invention.

Referring to FIG. 7, as for the distributed frequency blocks, when the physical frequency blocks are mapped to the logical frequency blocks, the physical frequency blocks may be mapped to the logical frequency blocks in the mixed (scrambled) order. Such mapping of the physical frequency blocks to the logical frequency blocks in the mixed order is called scramble mapping. The block indexes of the logical frequency blocks are arranged according to a scramble mapping scheme. The scramble mapping scheme may be made variably. For example, different scramble mapping schemes may be used between cells or sectors of the BS and between contiguous symbols. Information about the scramble mapping scheme may be made in a manner previously agreed with between the BS and the UE, or the BS may inform the UE about an applied one of several scramble mapping schemes.

When the localized frequency blocks and the distributed frequency blocks are disposed together in a single time zone, physical frequency blocks with respect to the localized frequency blocks are mapped to the logical frequency blocks in order, while the physical frequency blocks with respect to the distributed frequency blocks are mapped to the logical frequency blocks according to the scramble mapping scheme. In this case, the block indexes of the logical frequency blocks with respect to the localized frequency blocks are arranged in the same order as that of the block indexes of the physical frequency blocks, and the block indexes of the logical frequency blocks with respect to the distributed frequency blocks are arranged according to the scramble mapping scheme.

For example, If the ratio between the localized frequency blocks and the distributed frequency blocks is 2:1, the block indexes (#1, . . . , #2d) of the physical frequency blocks with respect to the localized frequency blocks are arranged as the block indexes (#1, . . . , #2d) of the logical frequency blocks as it is. The block indexes (#1, . . . , #d) of the physical frequency blocks with respect to the distributed frequency blocks are mixed according to the scramble mapping scheme so as to be arranged in the block indexes (#1, #d, #3, #2, . . . , or #4, #3, #2, #d) of the logical frequency blocks. In this case, the logical frequency blocks may be divided into two OFDM symbol periods, to which different scrambling mapping schemes may be applied.

Figure 8:
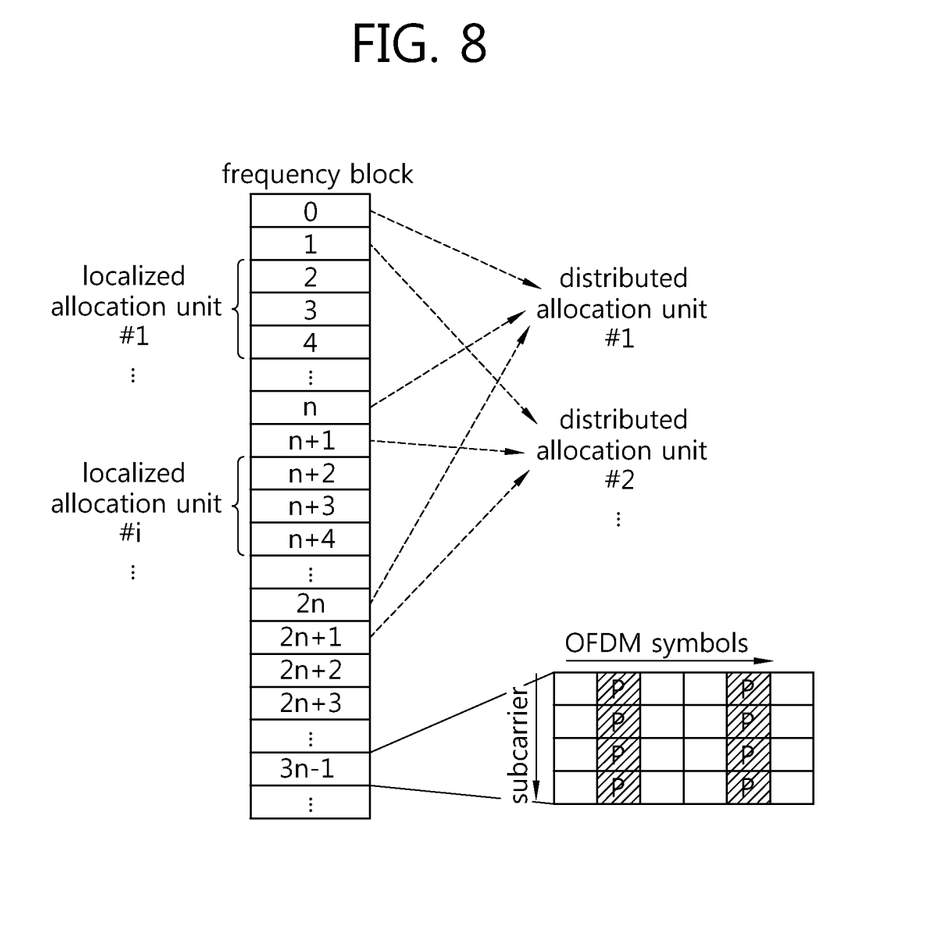
FIG. 8 shows an allocation scheme using allocation units according to one embodiment of the present invention.

FIG. 8 shows an allocation scheme using allocation units according to one embodiment of the present invention.

Referring to FIG. 8, it is assumed that the overall frequency band includes the N number of frequency blocks and a single frequency block includes the K number of subcarriers in the frequency domain (N, K>1, integers). The overall frequency band includes the K×N number of subcarriers in the frequency domain. In this case, the P number of frequency blocks are bundled and called an allocation unit (P>1, integer). The allocation unit is a minimum unit allocated to the UE at a time, including at least one frequency block.

The P number of frequency blocks included in the allocation unit may be contiguously or distributedly disposed. The allocation unit in which the frequency blocks are contiguously disposed is called a localized allocation unit, and the allocation unit in which frequency blocks are distributedly disposed is called a distributed allocation unit. The frequency blocks in the distributed allocation unit may be disposed to be spaced apart by N/P intervals. When the frequency blocks in the distributed allocation unit are distributedly disposed, subcarriers included in each frequency block may be distributedly allocated at the same time.

For example, if K is 4, N is 36, and P is 3, three frequency blocks are contiguously disposed to become the localized allocation unit, and three frequency blocks are disposed to be spaced apart by 36/3 intervals to become the distributed allocation unit. A single frequency block includes four subcarriers in the frequency domain. When six OFDM symbols are included in the time domain, data subcarriers may be allocated to the four OFDM symbols and pilot subcarriers (P) may be allocated to the two OFDM symbols. Symbols of user data or a control signal are allocated to the data subcarriers, and pilot symbols serving as a reference of channel estimation and data demodulation are allocated to the pilot subcarriers. There is no limitation in the range of the frequency domain and the time domain of the frequency blocks, and also there is no limitation in the number of frequency blocks included in the allocation unit.

The localized allocation unit and the distributed allocation unit may be used differently according to types of transmitted data. In general, user data is relatively large in size compared with a control signal, which, thus, uses a large amount of radio resource. Thus, several localized allocation units are allocated to the user data and distributed to the overall frequency band to obtain a frequency diversity effect. The distributed allocation unit in which frequency blocks are distributedly disposed is allocated to the control signal with a relatively small size to obtain the frequency diversity effect. Types of control signals include a CQI (Channel Quality Indicator), an ACK/NACK (Acknowledgement/Non-acknowledgement) signal, namely, a response to perform an HARQ (Hybrid-Automatic Repeat Request), a PMI (Precoding Matrix Indicator) or an RI (Rank Indicator) in a multi-antenna system, or the like. The information about an allocation unit allocated to the UE may be instructed via the FCH or the DL-MAP.

For example, when the UE requests allocation of radio resources to the BS, the BS schedules radio resources to be allocated to the UE. At this time, the BS checks whether data to be transmitted is user data or a control signal and then schedules the localized allocation unit or the distributed allocation unit. The BS informs the UE about an allocated allocation unit via the FCH or the DL-MAP. Then, the UE transmits/receives data to/from the BS based on the information about the allocation unit allocated to the UE.

In the above description, the logical mapping from the physical frame to the logical frame and the physical mapping from the logical frame to the physical frame may be performed in the mutually reverse process. The information about the logical mapping and the physical mapping is shared by the BS and the UE, and the UE can search a physical index from a logical index or search a logical index from a physical index.

Every function as described above can be performed by a processor such as a micro-processor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. A method of allocating radio resources in a wireless communication system, the method comprising:
   receiving, from a user equipment (UE), a request signal requesting allocation of radio resource for data or for a control signal;
   allocating an allocation unit including some of a plurality of physical frequency blocks to the user equipment (UE) by checking the request signal, wherein each of the plurality of physical frequency blocks being divided frequency band of a system frequency band and comprising at least one subcarrier in a frequency domain and at least one orthogonal frequency division multiplexing (OFDM) symbol in a time domain; and
   transmitting block indexes of logical frequency blocks included in the allocated allocation unit and scrambling information, wherein the scrambling information indicates a mapping between the block indexes of logical frequency blocks and block indexes of physical frequency blocks, wherein the allocated allocation unit is any one of a localized allocation unit comprising physical frequency blocks contiguous in the frequency domain and a distributed allocation unit comprising physical frequency blocks distributed in the frequency domain and wherein when the request signal requests allocation of radio resource for data, the allocated allocation unit is the localized allocation unit and the block indexes of the logical frequency blocks are arranged in the same order as those of physical frequency blocks, and when the request signal requests allocation of radio resource for a control signal, the allocated allocation unit is the distributed allocation unit and the block indexes of the logical frequency blocks are mapped to indexes of physical frequency blocks according to the scrambling information and different mappings are applied to each OFDM symbol comprising the distributed allocation unit.

2. The method of claim 1, further comprising:

receiving first channel state information from a first UE;

receiving second channel state information from a second UE; and allocating the localized allocation unit to the first UE and the distributed allocation unit to the second UE in a same resource region when the first channel state information indicates better channel state than the second channel state information.

3. The method of claim 1, further comprising:

informing the UE about allocated allocation unit using an frame control header (FCH) or a downlink-MAP(DL-MAP) or a broadcast message.

4. A method of communication for a user equipment (UE) in a wireless communication system, the method comprising:

transmitting a request signal requesting allocation of radio resource for data or for a control signal; and receiving block indexes of logical frequency blocks included in an allocated allocation unit and scrambling information, wherein the scrambling information indicates a mapping between the block indexes of logical frequency blocks and block indexes of physical frequency blocks, wherein the allocated allocation unit is any one of a localized allocation unit Comprising physical frequency blocks contiguous in the frequency domain and a distributed allocation unit comprising physical frequency blocks distributed in the frequency domain and wherein when the request signal requests allocation of radio resource for data, the allocated allocation unit is the localized allocation unit and the block indexes of the logical frequency blocks are arranged in the same order as those of physical frequency blocks, and when the request signal requests allocation of radio resource for a control signal, the allocated allocation unit is the distributed allocation unit and the block indexes of the logical frequency blocks are mapped to indexes of physical frequency blocks according to the scrambling information and different mappings are applied to each OFDM symbol comprising the distributed allocation unit.

5. The method of claim 4, further comprising:

receiving information informing the allocated allocation unit using an frame control header (FCH) or a downlink-MAP(DL-MAP) or a broadcast message.

* * * * *